United States Patent
Schai et al.

(10) Patent No.: US 11,193,813 B2
(45) Date of Patent: Dec. 7, 2021

(54) DOSING AND WEIGHING DEVICE AND METHOD FOR DETERMINING THE WEIGHT OF A PRODUCT IN A DOSING AND WEIGHING DEVICE

(71) Applicant: BÜHLER AG, Uzwil (CH)

(72) Inventors: Peter Schai, Uzwil (CH); René Haid, Oberuzwil (CH); Andreas Kleiner, Niederhelfenschwil (CH); Heinz Brand, St. Gallen (CH)

(73) Assignee: BÜHLER AG, Uzwil (CH)

( * ) Notice: Subject to any disclaimer, the term of this patent is extended or adjusted under 35 U.S.C. 154(b) by 0 days.

(21) Appl. No.: 16/320,697

(22) PCT Filed: Jul. 27, 2017

(86) PCT No.: PCT/EP2017/068994
§ 371 (c)(1),
(2) Date: Jan. 25, 2019

(87) PCT Pub. No.: WO2018/019932
PCT Pub. Date: Feb. 1, 2018

(65) Prior Publication Data
US 2019/0162581 A1    May 30, 2019

(30) Foreign Application Priority Data
Jul. 27, 2016  (EP) .................................. 16181513

(51) Int. Cl.
*G01G 13/24*  (2006.01)
*G01G 23/00*  (2006.01)

(52) U.S. Cl.
CPC ............. *G01G 13/24* (2013.01); *G01G 23/00* (2013.01); *G01G 13/246* (2013.01)

(58) Field of Classification Search
CPC ...... G01G 13/24; G01G 13/246; G01G 13/28; G01G 13/04; G01G 13/06; G01G 13/028;
(Continued)

(56) References Cited

U.S. PATENT DOCUMENTS 3,672,457 A * 6/1972 Hester .................. G01G 5/04
                                                     177/201
4,494,678 A * 1/1985 Klein .................. G01G 23/14
                                                     222/77

(Continued)

FOREIGN PATENT DOCUMENTS

CH        658724 A5     11/1986
DE     103 34 857 A1    3/2005
(Continued)

OTHER PUBLICATIONS

English Translation of CH658724.*
English Translation of EP1467190.*

*Primary Examiner* — Helen C Kwok
(74) *Attorney, Agent, or Firm* — Finch & Maloney, PLLC; Michael J. Bujold; Jay S. Franklin

(57) ABSTRACT

A dosing and weighing device (1) comprising a housing (2) having an inlet opening (3) and an outlet opening (4), and a weighing surface (5), which is operatively connected to at least one weight sensor (7), a mechanism (9) for detecting a pressure difference between a pressure in the housing upstream and a pressure in the housing downstream of the weighing surface (5). Via a control unit (8), the detected pressure difference is used to correct the weight detected by the weight sensor (7).

10 Claims, 2 Drawing Sheets

(58) Field of Classification Search
CPC ........ G01G 23/00; G01G 23/01; G01G 23/14; G01G 11/08; G01G 11/083
See application file for complete search history.

(56) References Cited

U.S. PATENT DOCUMENTS

| | | | | |
|---|---|---|---|---|
| 5,670,751 | A * | 9/1997 | Hafner | G01G 11/08 177/1 |
| 6,109,478 | A * | 8/2000 | Blenkinsop | G01G 13/026 177/119 |
| 6,267,267 | B1 * | 7/2001 | Johnson | F16K 3/085 222/56 |
| 6,722,294 | B2 * | 4/2004 | Cabrera-Llanos | G01G 13/028 110/341 |
| 7,191,919 | B2 * | 3/2007 | Ricciardi, Sr. | G01G 11/086 222/53 |
| 8,221,035 | B2 * | 7/2012 | Wolfschaffner | G01G 11/083 406/31 |
| 8,367,946 | B2 * | 2/2013 | Inauen | G01G 11/086 177/50 |
| 8,670,951 | B2 * | 3/2014 | Yeon | G01G 23/14 177/154 |
| 10,473,513 | B2 * | 11/2019 | Hansen | G01G 11/08 |
| 2005/0145420 | A1 * | 7/2005 | Wolfschaffner | G01G 13/028 177/116 |
| 2005/0189150 | A1 * | 9/2005 | MacMichael | G01G 13/04 177/116 |
| 2010/0170198 | A1 * | 7/2010 | Naf | B65B 31/024 53/432 |
| 2018/0172500 | A1 * | 6/2018 | Melati Rad | B65G 53/22 |

FOREIGN PATENT DOCUMENTS

| | | | |
|---|---|---|---|
| EP | 0 644 406 A1 | 3/1995 | |
| EP | 1467190 A2 * | 10/2004 | ............. G01G 11/08 |

* cited by examiner

DOSING AND WEIGHING DEVICE AND METHOD FOR DETERMINING THE WEIGHT OF A PRODUCT IN A DOSING AND WEIGHING DEVICE

This application is a National Stage completion of PCT/EP2017/068994 filed Jul. 27, 2017, which claims priority from European application serial no. 16181513.9 filed Jul. 27, 2016.

FIELD OF THE INVENTION

The invention is related to a dosing and weighing device, in particular for bulk materials, and a method for determining the weight of a product, in particular a bulk product, in a dosing and weighing device.

BACKGROUND OF THE INVENTION

Dosing and weighing devices usually comprise a housing with an inlet opening and an outlet opening for a product to be weighed and dosed, and are usually arranged in lines, e.g. in order to monitor the throughput of a product or to gravimetrically dose a product (e.g. in the case of bagging).

In simplified form, a weighing surface is arranged in a housing, which can be moved between a weighing position and a dosing position by means of an operating unit and is operatively connected to at least one weight sensor. The weighing surface in the weighing position prevents product flow between the inlet and outlet opening. A weight of the product loaded on the weighing surface can thus be determined by means of the at least one weight sensor. With the weighing surface in the weighing position, the product flow between inlet opening and outlet opening is at least partially enabled. A control unit is provided for controlling the operating unit, which is connected to the at least one weight sensor.

Due to the cyclic operation of the dosing and weighing device and the flow of the product in the dosing and weighing device or in the product line, pressure fluctuations occur in the housing which could have an influence on the accuracy of the dosing and weighing device. In order to counteract this, it is therefore known that dosing and weighing devices are equipped with vent openings (so-called false air openings) through which, however, contaminations could enter the product flow, or due to which environmental conditions such as humidity could have a negative influence on the product. If the air vents are provided with filters, these must be cleaned and/or replaced regularly. However, even therewith complete protection against contamination is not guaranteed. Such devices are less suitable for use in the food or pharmaceutical industries, where rather closed systems are preferred.

It was therefore the problem of the invention to provide a dosing and weighing device as well as a method for determining the weight of a product, which avoid the drawbacks of the state of the art and in particular enable the reliable operation of an externally closed dosing and weighing device.

SUMMARY OF THE INVENTION

The problem is solved by means of a dosing and weighing device and a method for determining the weight of a product according to the features of the independent claims.

According to the present invention, means for determining a pressure difference between a pressure in the product flow upstream and a pressure in the product flow downstream of the weighing surface are provided. By means of the control unit, the pressure difference determined is used to correct the weight determined by the weight sensor. In other words, a pressure in the housing can be determined upstream and downstream of the weighing surface in the direction of product flow.

Thus, the dosing and weighing device according to the present invention is closed to the outside and can be operated more hygienically. Differential pressure compensation also enables improvement of the process stability, which in turn results in more accurate and faster operation of the dosing and weighing device.

The weighing surface is preferably designed as a pivotable weighing surface, in particular as a pivotable weighing flap.

The means for determining the pressure difference are preferably designed as a pressure difference sensor.

This represents a simple and cost-effective way of implementation. In addition, a pressure difference is already provided as a signal to the control unit, so that the computing effort of the control unit is reduced.

Alternatively, the means for determining the pressure difference may comprise a pressure sensor located up-stream of the weighing surface and a pressure sensor located downstream of the weighing surface. In this case, the control unit or another computing unit must first determine a pressure difference, which is then used to determine the weight.

Preferably, a gas pressure difference, in particular an air pressure difference, can be determined using the means for determining the pressure difference.

If bulk material is transported in a gas flow (e.g. a protective gas flow) or in an air flow, the determination of the pressure difference is best suited for correcting the determination of the weight.

The housing is preferably designed to be hermetic towards the outside. This means that with the exception of the inlet opening and the outlet opening, the housing is otherwise airtight and, in particular, that there are no compensating openings, possibly with filters and the like, as known from the state of the art. The device can thus be operated in a closed product flow.

The outlet opening and the inlet opening preferably have the same cross-sectional area. The cross-sectional area is preferably determined perpendicular to the direction of product flow. Such a design of the housing has the advantage that the determination of the weight is simplified, since cross-sectional changes, which can lead to a gain/change of the pressure difference within the housing, do not have to be considered.

The invention also is related to a method for determining the weight of a product, in particular a bulk product, in a dosing and weighing device. The embodiments and advantages described above with respect to the dosing and weighing device are correspondingly applicable to the method according to the present invention. The dosing and weighing device is preferably a dosing and weighing device as described above.

The device comprises a housing with an inlet opening and an outlet opening for a product to be weighed and dosed, and a dosing and weighing unit with a weighing surface which is operatively connected to at least one weight sensor. In a product flow between inlet opening and outlet opening, means are arranged for determining a pressure difference between a pressure in the product flow upstream of the dosing and weighing unit and a pressure in the product flow downstream of the dosing and weighing unit. In other words, a pressure in the housing can be determined up-stream and downstream of the weighing surface in the direction of product flow.

According to the present invention, the weight of the product loaded on the weighing surface is determined by means of the at least one weight sensor. The pressure difference determined is then used to correct the weight determined by the weight sensor.

Preferably, with the means for determining a pressure difference there is determined a gas pressure difference, in particular an air pressure difference.

BRIEF DESCRIPTION OF THE DRAWINGS

The invention is better described below using a preferred embodiment in conjunction with the drawing. Therein it is shown.

DETAILED DESCRIPTION OF THE PREFERRED EMBODIMENT(S)

Figure 1:
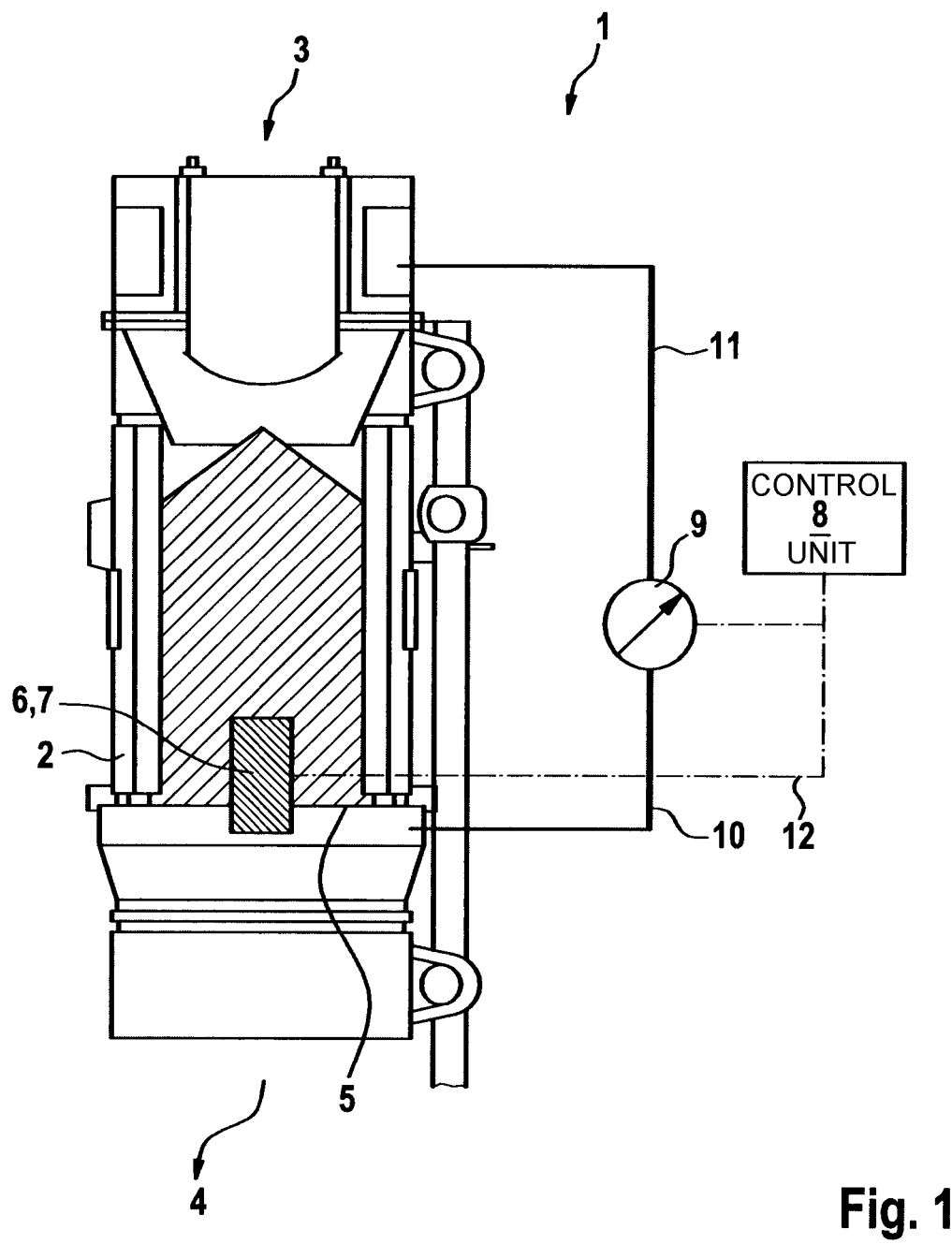
FIG. 1 a schematic representation of a device according to present invention, and FIG. 2 a graphic representation of the measurement error without differential pressure compensation.

FIG. 1 schematically shows a dosing and weighing device 1. It comprises a housing 2 through which a product flows. Arrows 3 and 4 respectively indicate an inlet opening and an outlet opening for the product. A weighing surface 5 in the form of a pivotable flap is arranged in the housing. The weighing surface 5 can be reversibly pivoted from a weighing position into a dosing position by means of an operating unit 6.

In the weighing position, product flow between inlet opening 3 and outlet opening 4 is prevented. The product coming from the inlet opening accumulates on the weighing surface 5. The weighing surface is connected to a weight sensor 7 so that a weight of the product loaded on the weighing surface 5 can be determined.

In the dosing position, on the other hand, the product flow between inlet opening 3 and outlet opening 4 is enabled.

There are no ventilation openings or the like in the housing 2.

A differential pressure sensor 9 is provided to compensate for pressure fluctuations in the housing which can influence the weight determination. Via lines 10 and 11, a pressure difference between a pressure in the housing downstream (line 10) and upstream (line 11) of the weighing surface 5 can be determined.

A control unit 8 is connected to the operating unit 6, the weight sensor 7 and the differential pressure sensor 9 via a connecting cable 12, which can be wired or wireless.

When weighing the product, pressure differences occurring in housing 2, which could have an influence on the weight determination by means of weight sensor 7, can thus be detected and used by the control unit 8 to correct the weight determined by the weight sensor 7.

If the pressure downstream of the weighing surface 5 is higher than the pressure upstream of the weighing surface 5, the weight sensor 7 will detect less weight than there actually is on the weighing surface 5. On the other hand, at a higher pressure upstream of the weighing surface 5, the weight sensor 7 will determine more weight than there actually is on the weighing surface 5.

By using the pressure difference, the weight determined by the weight sensor 7 can be corrected, and only then the operating unit 6 for dosing will be triggered.

Figure 2:
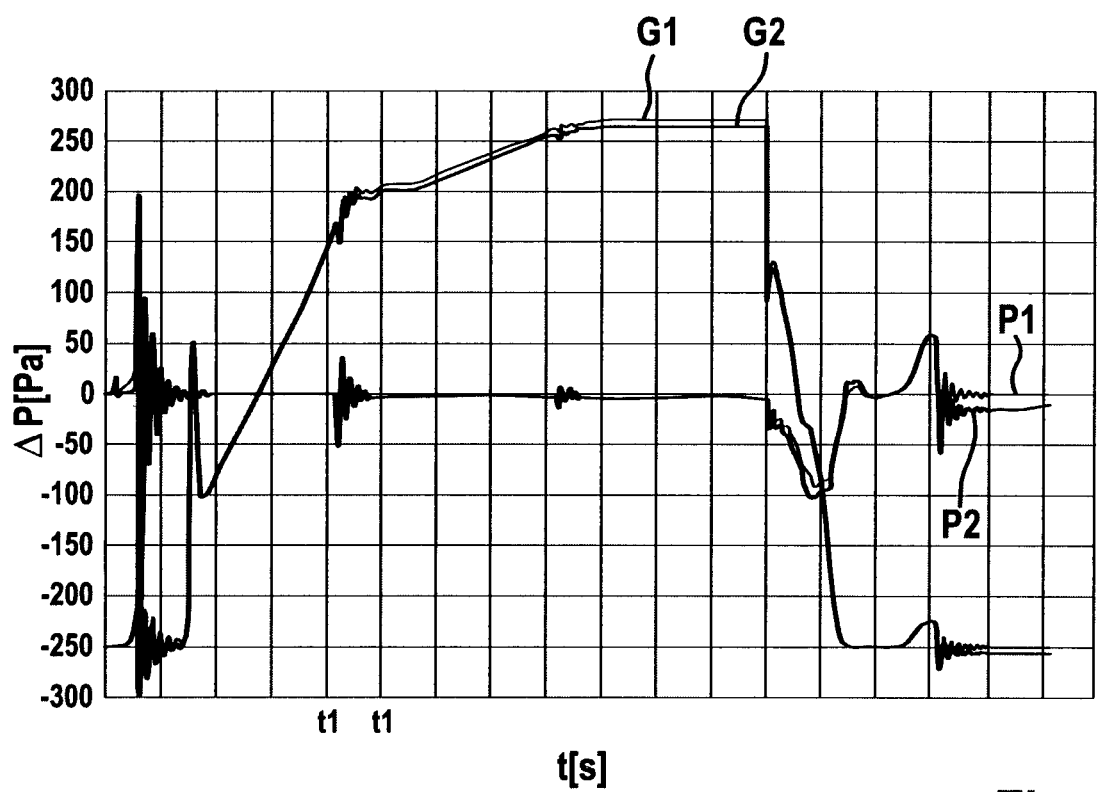

FIG. 2 shows the weight curves G1 and G2 of the weight determined by a weight sensor 7 in a device without differential pressure compensation.

The left ordinate axis shows a pressure difference ΔP in Pa measured in the housing 2, and the abscissa axis shows a dimensionless variation in time t.

In the weight measurement G2, the pressure upstream of the weighing surface 5 was reduced compared to the pressure downstream of the weighing surface 5 by suction of air.

As can be seen from the weight curve G2, the weight determined by the weight sensor 7 is lower than the weight curve G1, so that at the end of the measurement there is a deviation, which however is only to be attributed to the suction of air.

Furthermore, it can be seen from the curves P1 and P2 (each assigned to the weight curves G1 and G2) that during the operation pressure differences occur in the housing 2, which result in the two weight curves drifting apart (cf. e.g. between points t2 and t3).

With a device or method in accordance with the present invention, such a deviation is essentially avoided, since the differential pressure is always used to correct the weight determined by the weight sensor 7.

The invention claimed is:

1. A dosing and weighing device for bulk materials comprising:
    a housing with an inlet opening and an outlet opening for a product to be weighed and dosed;
    a weighing surface which is movable between a weighing position and a dosing position by an operating device and is operatively connected to at least one weight sensor, wherein
        in the weighing position a product flow between said inlet opening and said outlet opening is prevented and thus a weight of the product loaded on the weighing surface can be determined by the at least one weight sensor, and
        in the dosing position, the product flow between said inlet opening and said outlet opening is at least partially enabled, and
    a control unit which is designed at least for controlling the operating device and is connected to the at least one weight sensor,
    wherein means for determining a gas pressure difference between a pressure in the housing upstream on a first side of the weighing surface of the at least one weight sensor, in a product flow direction, and a pressure in the housing downstream on a second side of the weighing surface of the at least one weight sensor, in the product flow direction, and by the control unit the determined pressure difference is used to correct the weight determined by the weight sensor, and
    there are no ventilation openings in the housing.

2. The dosing and weighing device according to claim 1, wherein said weighing surface is pivotable between the weighing position and the dosing position.

3. The dosing and weighing device according to claim 1, wherein the means for determining the gas pressure difference is designed as a pressure difference sensor.

4. The dosing and weighing device according to claim 1, wherein the means for determining the gas pressure difference comprise a pressure sensor arranged upstream of the weighing surface and a pressure sensor arranged downstream of the weighing surface.

5. The dosing and weighing device according to claim 1, wherein the gas pressure difference is an air pressure difference.

6. The dosing and weighing device according to claim 1, wherein the housing is airtight towards the outside.

7. The dosing and weighing device according claim 1, wherein the inlet opening and the outlet opening have equally large cross-sectional areas.

8. A method for determining the weight of a bulk product, in the dosing and weighing device according to claim 1, the method comprising:
    a housing with an inlet opening and an outlet opening for a product to be weighed and dosed and a dosing and weighing unit with a weighing surface which is operatively connected to at least one weight sensor,
    wherein in a product flow direction between said inlet opening and said outlet opening:
    means are provided for determining a gas pressure difference between a pressure in the housing up-stream of the dosing and weighing unit and a pressure in the housing downstream of the dosing and weighing unit, comprising the steps:
        determining a weight of the product loaded on the weighing surface by the at least one weight sensor, and
        using a determined gas pressure difference, detected on first and second opposed sides of the weighing surface of the at least one weight sensor, to correct the weight determined by the weight sensor.

9. The method according to claim 8, wherein
    an air pressure difference is determined by the means for determining the gas pressure difference.

10. A dosing and weighing device for bulk materials comprising:
    a housing with an inlet opening and an outlet opening for a product to be weighed and dosed;
    a weighing surface being located within the housing between said inlet opening and said outlet opening, the weighing surface being movable between a weighing position and a dosing position by an operating device and is operatively connected to at least one weight sensor, wherein
        in the weighing position a product flow between said inlet opening and said outlet opening is prevented and thus a weight of the product loaded on the weighing surface can be determined by the at least one weight sensor, and
        in the dosing position, the product flow between said inlet opening and said outlet opening is at least partially enabled, and
    a control unit which is designed at least for controlling the operating device and is connected to the at least one weight sensor,
    wherein means for determining a gas pressure difference between a pressure in the housing upstream on a first side of the weighing surface of the at least one weight sensor, in a product flow direction, and a pressure in the housing downstream on an opposed second side of the weighing surface of the at least one weight sensor, in the product flow direction, and by the control unit the determined pressure difference is used to correct the weight determined by the weight sensor, and
    there are no ventilation openings in the housing.

* * * * *